(12) United States Patent
Domeniconi et al.

(10) Patent No.: US 12,430,103 B1
(45) Date of Patent: Sep. 30, 2025

(54) AUTOMATIC GENERATION OF COMPLIANT USER INTERFACE CODE

(71) Applicant: U.S. Bank National Association, Minneapolis, MN (US)

(72) Inventors: Giacomo Domeniconi, Miami, FL (US); Samuel Assefa, Watertown, MA (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/057,008

(22) Filed: Feb. 19, 2025

(51) Int. Cl.
*G06F 9/44* (2018.01)
*G06F 8/30* (2018.01)
*G06F 9/445* (2018.01)
*G06F 9/45* (2006.01)

(52) U.S. Cl.
CPC ..................... *G06F 8/30* (2013.01)

(58) Field of Classification Search
CPC ........................................................ G06F 8/30
See application file for complete search history.

(56) References Cited

U.S. PATENT DOCUMENTS

| | | | |
|---|---|---|---|
| 11,651,245 | B2 | 5/2023 | Defiebre |
| 12,271,720 | B1* | 4/2025 | Silver ..................... G06N 5/025 |
| 2022/0067169 | A1* | 3/2022 | De Cremer ............. G06F 9/451 |
| 2022/0121723 | A1* | 4/2022 | Page ................... G06F 11/0784 |
| 2023/0161946 | A1* | 5/2023 | Bradley .................. G06F 16/22 |
| | | | 715/205 |
| 2023/0236802 | A1* | 7/2023 | Raju ....................... G06F 40/30 |
| | | | 717/104 |
| 2024/0119156 | A1* | 4/2024 | Stewart ..................... G06F 8/77 |
| 2024/0126530 | A1* | 4/2024 | Kairali ...................... G06F 8/61 |
| 2024/0311089 | A1* | 9/2024 | Duggal ..................... G06F 8/22 |
| 2025/0021309 | A1* | 1/2025 | Schmidt .................... G06F 8/34 |
| 2025/0023697 | A1* | 1/2025 | Lee ........................... H04L 5/00 |
| 2025/0138816 | A1* | 5/2025 | Hutchings ................. G06F 8/72 |

FOREIGN PATENT DOCUMENTS

WO   WO-2024145209 A1 *   7/2024

OTHER PUBLICATIONS

English Translation, Stevens (WO 2024145209 A1), 2024, pp. 1-41. (Year: 2024).*

(Continued)

*Primary Examiner* — Mongbao Nguyen
(74) *Attorney, Agent, or Firm* — Garg Law Firm, PLLC; Rakesh Garg; Chris Ziolkowski

(57) ABSTRACT

An embodiment detects, in a structured data corresponding to a graphical user interface (UI) design, a UI component. The embodiment determines, using a compliance specification retrieved from a compliance system repository, that the UI component is non-compliant. The embodiment extracts a code block from the compliance system repository, where the code block is executable to render a compliant component in place of the UI component on a UI rendering from the UI design. The embodiment combines, to automatically output a front-end UI code, the code block with generated code, the generated code corresponding to another element of the UI design, and the front-end UI code rendering a complete UI page corresponding to the UI design.

20 Claims, 12 Drawing Sheets

(56) References Cited

OTHER PUBLICATIONS

Yuxuan Wan, Automatically Generating UI Code from Screenshot: A Divide-and-Conquer-Based Approach, 2024, pp. 1-13. https://arxiv.org/pdf/2406.16386v1 (Year: 2024).*

Wood, Adobe XD Classroom in a Book® 2020 release, 2020, https://ptgmedia.pearsoncmg.com/images/9780136583806/samplepages/9780136583806_Sample.pdf.

Sketch, Developer handoff, Sep. 17, 2024, https://www.sketch.com/docs/developer-handoff/.

Pietroluongo, InVision Studio: An Overview and Review, Sep. 20, 2022 https://www.elegantthemes.com/blog/design/invision-studio-an-overview-and-review.

Affinity, Affinity Designer 2 (Desktop) Quickstart Guide, 2024, https://affinity.serif.com/en-us/learn/designer/desktop/quickstart/.

Adobe, Adobe Photoshop Help, Nov. 5, 2019, https://helpx.adobe.com/pdf/photoshop_reference.pdf.

Gimp, GNU Image Manipulation Program—User Manual, 2024, docs.gimp.org/odftest/en.pdf.

React, Describing the UI, 2024, https://react.dev/learn/describing-the-ui.

Angular, Components, 2024, https://angular.dev/essentials/components.

Adobe, Adobe Experience Manager Guides, 2024, https://business.adobe.com/content/dam/dx/us/en/products/experience-manager/guides/aem-guides/Adobe_Experience_Manager_Guides_Solution_Brief.pdf.

VUE.JS, Introduction, 2024, https://vuejs.org/guide/introduction.html.

Li et al., ULDGNN: A Fragmented UI Layer Detector Based on Graph Neural Networks, Aug. 13, 2022.

Jiang et al., Graph4GUI: Graph Neural Networks for Representing Graphical User Interfaces, CHI '24, May 11-16, 2024, https://doi.org/10.1145/3613904.364282.

* cited by examiner

AUTOMATIC GENERATION OF COMPLIANT USER INTERFACE CODE

RELATED APPLICATION

Aspects of the inventive concepts disclosed here are related to the subject-matter disclosed in U.S. patent application Ser. No. 19/044,971, titled "Identifying Components and Patterns in Digital Designs", and filed on Feb. 4, 2025, which is incorporated in the present application by reference in its entirety for any and all purposes.

BACKGROUND

User Interface (UI) refers to the visual elements of a product (e.g., a physical or virtual product, such as an application ("app")) or system with which one or more users interact in or with a computing environment. Typically, a UI includes UI components (components) or elements, such as buttons, icons, menus, text fields, and many other types of components that facilitate user interaction and information presentation. Thus, a UI can include components both for receiving input from a user and for providing output to the user. In some instances, a single component can both provide information to a user and receive input. UI is primarily concerned with how the user interacts with a software or system, and designing a UI involves designing these components to be functional and visually appealing.

User experience (UX) is the overall experience a user has when using a UI, especially in terms of how easy or satisfying the UI is to use. UX can be described in terms of single UI components, the overall experience of interacting with an entire UI, or the overall experience of using a product or system to achieve a task. UX encompasses everything from the usability and accessibility of a system to the emotions a user feels when interacting with the UI. Where UI is concerned with the visual design of a website, page, or screen of a software, UX is concerned more with how the UI works, how intuitive the flow and function implemented by the UI feels, how efficiently tasks can be completed using the UI, and how enjoyable the process is to a user. A product or system having an improved UI or a UX can result in the product or system having technical advantages over other products or systems lacking such improvements. Such technical advantages can include one or more aspects selected from the group consisting of: improved battery life, lower power consumption, decreased use of processing resources, decreased use of networking resources, improved accessibility, other advantages, or combinations thereof.

User interface code (UI code, or front-end code) refers to the actual programming or markup that implements the components and design elements of a UI. This includes HTML, CSS, and JavaScript for web applications, or similar languages/frameworks for mobile or desktop applications. UI code is responsible for making the UI components interactive, functional, and usable for user input and interactions.

Presently, tools are available for creating UI designs, engineering UX, or both. Some examples of such tools are FIGMA, which is a tool commonly used for UX design and to facilitate the creation of user interfaces for websites and mobile applications using a system of nested frames and layers; ADOBE XD, which is a vector-based user experiences design tool for web and mobile applications; SKETCH, which is A vector graphics editor used for designing user interfaces and user experiences; INVISION STUDIO, which is a screen design tool; AFFINITY DESIGNER, which is a vector graphic design software; and ADOBE PHOTOSHOP, GIMP, and others, which are graphic design tools supporting layer-based editing for creating complex UI designs.

A front-end developer plays a vital role in bringing web designs to life, ensuring that websites are visually appealing, functional, and user-friendly across different devices and browsers. HTML, CSS, and JavaScript are fundamental tools in the arsenal of a front-end developer. These technologies are used to structure content, style visual elements, and add interactivity to web pages. Front-end developers often utilize frameworks and libraries to streamline development and enhance functionality. Some popular tools and technologies used by front-end developers include:

REACT: A JavaScript library for building user interfaces, particularly known for its virtual Document Object Model (DOM) feature which optimizes re-rendering processes for dynamic web applications.

ANGULAR: A platform and framework for building single-page client applications using HTML and TypeScript, known for its two-way data binding and comprehensive solutions encompassing various development needs.

ADOBE EXPERIENCE MANAGER (AEM): A tool that integrates with these technologies to manage content and assets efficiently, streamlining the workflow for front-end developers.

VUE.JS: A progressive JavaScript framework used for building user interfaces, it is designed to be incrementally adoptable and can easily integrate with other projects or libraries.

SUMMARY

The present disclosure includes inventive concepts relating generally to generating code for a graphical user interface, such as methods, systems, and computer programs for automatic generation of compliant user interface code.

The illustrative embodiments provide for automatic generation of compliant user interface code. An embodiment includes detecting, in structured data corresponding to a graphical user interface (UI) design, a UI component. The embodiment further includes determining, using a compliance specification retrieved from a compliance system repository, that the UI component is non-compliant. The embodiment further includes extracting a code block from the compliance system repository, where the code block is executable to render a compliant component in place of the UI component on a UI rendering from the UI design. The embodiment further includes combining, to automatically output a front-end UI code, the code block with generated code, the generated code corresponding to another element of the UI design, and the front-end UI code rendering a complete UI page corresponding to the UI design.

Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
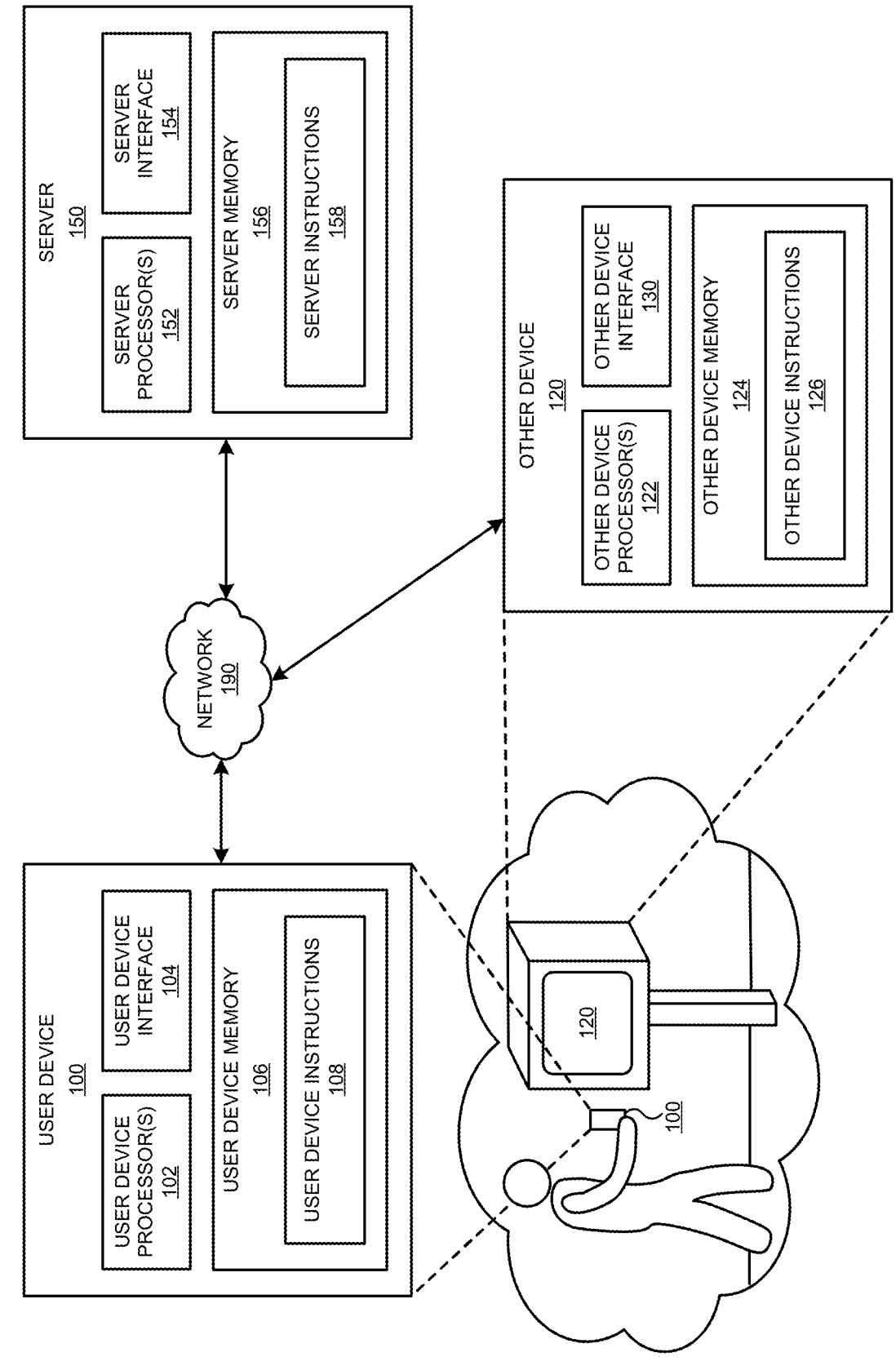
FIG. 1 depicts a block diagram of a computing environment in which an illustrative embodiment may be implemented.

While UI and UX are two parts of an overall design, where implementation circumstances might require, a reference to an aspect of UI should be understood to include aspects of UX, and vice-versa, when the two terms are used herein, unless expressly distinguished where used.

The illustrative embodiments include systems and methods for translating a UX design into code, following standards, guidelines, and scripts provided by the compliance organization, body, or team (collectively referred to hereinafter as "compliance specification" unless expressly distinguished where used). Within the context of the illustrative embodiments described herein, the term "compliance" refers to a requirement that certain aspects of the visual components, interactive elements, and the general presentation of a UI and the corresponding UX design adhere to a set of one or more specified values for those aspects. Within the context of the illustrative embodiments described herein, the term "compliance specification" refers to the set of one or more specified values for those aspects of the visual components, interactive elements, and the general presentation of a UI and the corresponding UX design. Some non-limiting examples of compliance specification include the color of a button, the color and size of text on the button, the size of text in a menu, the type of font on a UI element, and many others. A product having a first UX that accords more with the compliance specification is improved relative to the product having a second UX that accords less with the compliance specification. In particular, the product having the first UX has improved capability in interacting with the user and responding in a way that the user expects. Such improvements result in fewer computing resources wasted on irrelevant actions that do not respond in a way that the user expects.

Specifically, once a UX design is ready to be translated into code, there are two main stages in the flow contemplated by the illustrative embodiments: (i) Identification of components, patterns, styles from the design-particularly those components, patterns or styles that are subject to a compliance specification (hereinafter collectively and interchangeably referred to as "compliance component(s)"); and (ii) translation of each component into front-end code.

One embodiment obtains, as input, information from a UX design tool (e.g., a design that is exported in JSON format via an API). As a non-limiting example, a design constructed using frames and layers in FIGMA can be exported in JSON format from FIGMA via a FIGMA REST API. The embodiment analyzes the exported design as structured data (e.g., a JSON file containing various pieces of information) including a tree-like dataset for each frame that includes a set of properties (e.g., positions, font color, bounding boxes, visibility, etc.) associated with some or all components in the design, and a list of child frames.

Some design tools also allow export of the UI-UX design as a set of one or more visual images. One embodiment also obtains, as input, image representation of the UI-UX design, when available.

As described herein, an embodiment configures and uses specific methodologies to detect in the design those components and styling information that are either already pre-approved compliant components (buttons, links, etc.) or are components that are not compliant in some respect but are subject to compliance specification. Some examples of these methodologies may involve one or more aspects (1) and (2) below, other aspects or combinations thereof.

(1) A key-pair match, as in components libraries in some UX design tools, that allows the retrieval of the components or components_set master IDs if pulled from shared libraries.

(2) A Machine Learning model trained to recognize such components. The model may involve one or an ensemble models and techniques, such as (A)-(D) below, other techniques, or combinations thereof:

(A) A graph neural network (GNN) trained to recognize nodes, or sub-tree, in the design layers. A design can be converted into a graph, more specifically into a tree structure. Each node in the tree represents a frame, and the edges represent the parent-child relationships among frames. Each component may be seen as subtree of the design's tree. A GNN may be trained on recognizing root nodes of the components, in a node classification setting. The list of possible node labels for the classification task would be the list of components plus a 'None' class—for instance, <button>, <list>, <text_input>, . . . , <none>.

(B) An object detection vision model, for example a You Only Look Once (YOLO) model. Trained to visually recognize components from the image export of a design. A training set for these models may be automatically created by exporting the images of design using the APIs of design tools that allow image exports, and pinpointing the position of known components, labeling them with bounding boxes. For YOLO models, the dataset can be created with a folder of design images and for each one, a textual file containing a list of bounding boxes defined, for some embodiments, as quintuple of <label,center_X,center_Y,width,height>

(C) A LLM or related Retrieval-Augmented Generation (RAG) pipeline that would scan the exported JSON (or a processed version of some structured export) of a design and will look for similarities and patterns that can be classified as compliance components.

(D) Any Machine Learning (decision trees, SVMs, etc.) or Deep Neural Networks applied to a set of specifically engineered features, created with the information available in the JSON or other structured data of a design, classifying each frame of the design into categories similarly to the node prediction with GNN case.

Once the known pre-approved components of a target design are identified, an embodiment deploys the second phase, which is the code generation. This phase can include the generation of compliance-approved front-end code (compliant code, or compliant front-end code). One embodiment generates REACT.js code, but the embodiment can be adapted to produce code in any other suitable coding language.

According to one embodiment, the first step of code generation is the generation of the code related to each identified component. This phase can be implemented in several ways according to different embodiments. For example, One embodiment uses heuristics and mapping between the component properties available from the exported design, into the properties of the component pulled from a component's specification in a compliance repository.

Another embodiment prompts an LLM to generate the code, providing the LLM two main parts of information: One part is a context containing as much information as possible on the compliance component that is to be encoded. Such information may contain plain information, a "readme" file of the related repository, examples of code, best practices, etc. the other part is the information available from the design tool in the exported design on the specific instance of the component that is to be encoded. This information may be the whole raw JSON from the component subtree, or some extracted information-such as the text contained therein, the main properties (e.g., color, primary or secondary instances, style, etc.)

Another embodiment employs a hybrid/multi-steps approach to compliant code where a first code would be generated by the heuristic (or the LLM itself) that is then checked, vetted and modified if needed by an LLM having the two pieces of information described above.

One embodiment creates one.js file containing the generated component code and a main page file that imports and combines the generated components to run the UI.

The illustrative embodiments contemplate that an LLM may also be used to generate code adhering to the compliance guidelines, to automatically generate code for pieces of the UX design that have not been recognized as approved or compliant components. Using as input either the information available in the frames—e.g., text, properties, or the visual aspects directly from the design, if the LLM is equipped with multi-modal and vision capabilities.

According to one embodiment, an LLM can additionally be used to generate the position and general style of the main page. The LLM is trained to produce a general style and placement of each imported component according to the design and compliance specification.

The illustrative embodiments recognize that even though the presently available UI-UX design tools can produce a design in an object model form, image form, and even front-end code, their capabilities for doing so are limited when it comes to accommodating compliance objectives. Mostly, the outputs of the presently available tools are limited to and usable with UI component libraries that are pre-associated with the tools. Any modification to those components that must be performed for other objectives, such as compliance, must be done separately and outside the tool's capabilities. For example, the illustrative embodiments recognize that in some tools, it is possible to detect when a component is sourced from another file or library, allowing for the identification of design frames that utilize pre-approved components. However, this connection remains valid only if the designers use the pre-approved components without altering their structural elements (e.g., a designer may change the text on a button but should not modify the button's color or text style). The illustrative embodiments recognize that presently, there isn't a clear and easy way to translate a design element, such as a UI component into a compliant, pre-approved, front-end code.

Furthermore, the illustrative embodiments recognize that the compliance specification is subject to changes over time. When the compliance specification changes, UI-UX designs should be able to pick up those changes automatically as a part of the normal design workflow without requiring relinking of libraries and other manual steps. The illustrative embodiments recognize that not only are presently available tools unable to seamlessly accommodate UI-UX component modifications for compliance, but they are also unable to adapt front-end code generation in response to dynamically changing compliance specification. At present, the worlds of compliance and design are disjointed, as is the process of code generation. The different steps involved have very little automation due to the complexity of the task, particularly in general cases where main focus of the existing tools is to provide and enable design and code generation using their own libraries of UI elements.

The present disclosure addresses the deficiencies described above by providing a solution that allows automatic adjustment of UI-UX designs and front-end code in response to dynamically changing compliance specifications, compliance guidelines, and compliance presets in a two-stage process as described herein. The proposed framework of the illustrative embodiments expands the technological capabilities of UI-UX design tools without requiring modifications to the tools themselves.

FIG. 1 depicts a block diagram of a computing environment in which an illustrative embodiment may be implemented. The computing environment, labeled and referred to as system 10, includes a user device 100, an other device 120, and a server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the automatic generation of compliant user interface code.

User device 100 is a device used by a user that can be used as part of processes described herein. User device 100 can include one or more aspects described elsewhere herein such as where front-end code 220 of FIG. 2 may execute. In many examples, user device 100 is a personal computing device, such as a smart phone, tablet, laptop computer, or desktop computer. But the device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of the user device 100 that execute instructions, such as instructions that obtain data, process the data, and provide output based on the processing. The one or more user device processors 102 can include one or more aspects necessary to execute front-end code 220 of FIG. 2.

The one or more user device interfaces 104 are one or more components of the user device 100 that facilitate receiving input from and providing output to something external to the user device 100. The one or more user device interfaces 104 can include one or more aspects necessary to present the user interface display resulting from the execution of front-end code 220 of FIG. 2.

User device memory 106 is a collection of one or more components of the user device 100 configured to store instructions and data for later retrieval and use. User device memory 106 can include one or more aspects described below in relation to storing front-end code 220 of FIG. 2 for execution on user device 100. As illustrated, user device memory 106 stores user device instructions 108 and other suitable user device code, some of which may take the form of front-end code 220 of FIG. 2.

User device instructions 108 are a set of instructions that, when executed by one or more of the one or more user device processors 102, cause the one or more user device processors 102 to perform an operation described herein. In examples, instructions 108 can include those of a mobile application (e.g., that may be obtained from a mobile application store, such as the APPLE APP STORE or the GOOGLE PLAY STORE). The mobile application can provide a user interface for receiving user input from a user and acting in response thereto.

User device interface 104 can further provide output to the user. In some examples, user device instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal-such as an electronic payment terminal, an automated customer interaction machine or device-such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects necessary to execute front-end code 220 of FIG. 2.

Other device memory 124 is a collection of one or more components of other device 120 configured to store instructions and data for later retrieval and use. Other device memory 120 can include one or more aspects described below in relation to storing front-end code 220 of FIG. 2 for execution on other device 120. Other device memory 120 can store other device instructions 126, some of which may take the form of front-end code 220 of FIG. 2.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects necessary to present the user interface display resulting from the execution of front-end code 220 of FIG. 2.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects necessary to execute the code for compliance enforcement engine 206 of FIG. 2, execute the code generation application 214 of FIG. 2, produce front-end code 220 of FIG. 2, or some combination thereof.

The one or more server interfaces 154 are one or more components of server 150 that facilitate receiving input from and providing output to something external to server 150. The one or more server interfaces 154 can include one or more aspects described below in relation to interfacing with and receiving inputs from UX design tool 202 of FIG. 2, compliance system 204 of FIG. 2, and interacting with other systems and components described herein.

Server memory 150 is a collection of one or more components of server 150 configured to store instructions and data for later retrieval and use. Server memory 150 can include one or more aspects described below in relation to the various embodiments. The server memory 150 can store server instructions 158, some of which may take the form of code for compliance enforcement engine 206 of FIG. 2, code for code generation application 214 of FIG. 2, and other server-based components that will be apparent from this disclosure to those of ordinary skill in the art.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
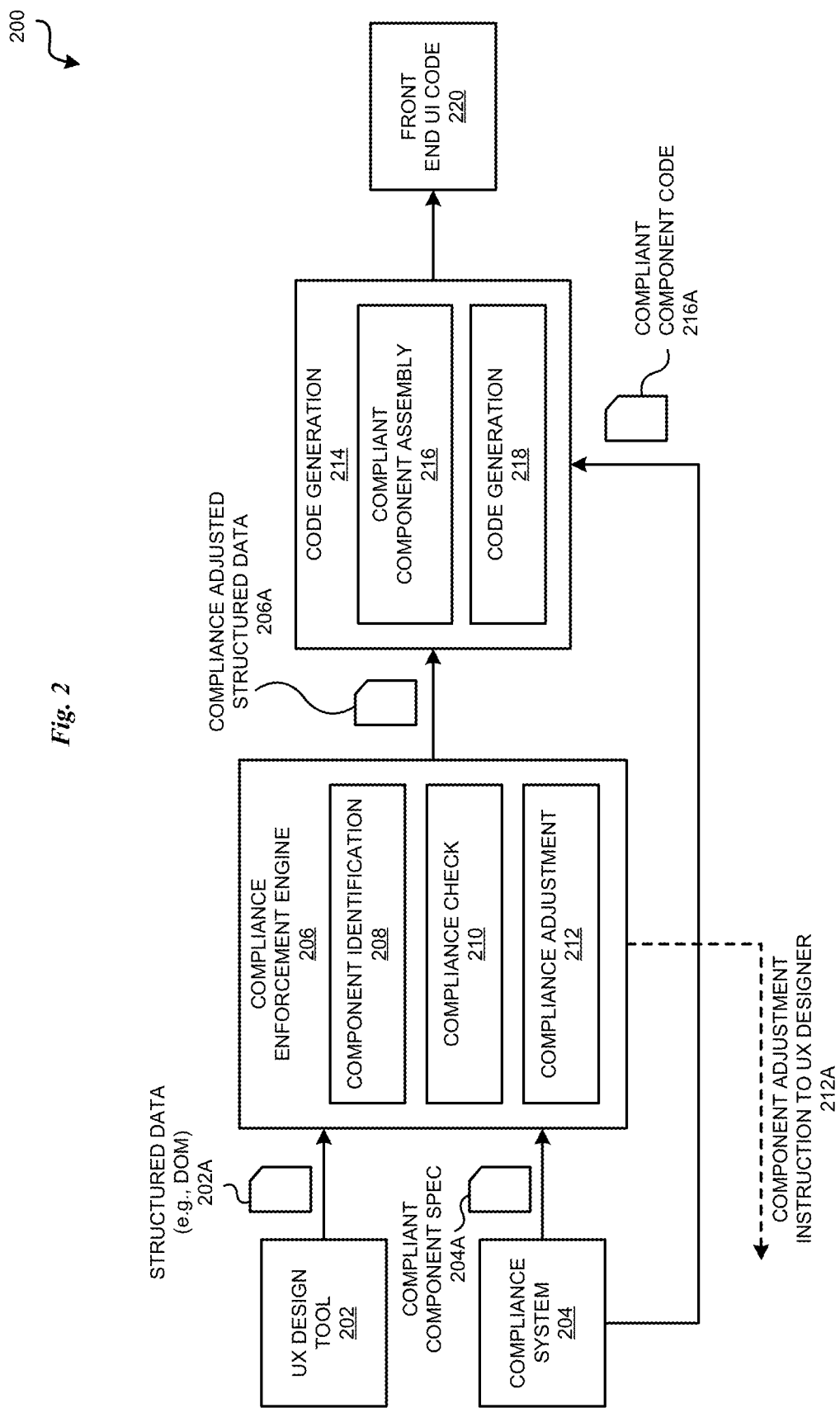
FIG. 2 depicts a block diagram of an example configuration for automatic generation of compliant user interface code in accordance with an illustrative embodiment.

FIG. 2 depicts a block diagram of an example configuration 200 for automatic generation of compliant user interface code in accordance with an embodiment. In the illustrated embodiment, compliance enforcement engine 206 and some other components may execute in server 150 or another component of FIG. 1.

Figure 9B:
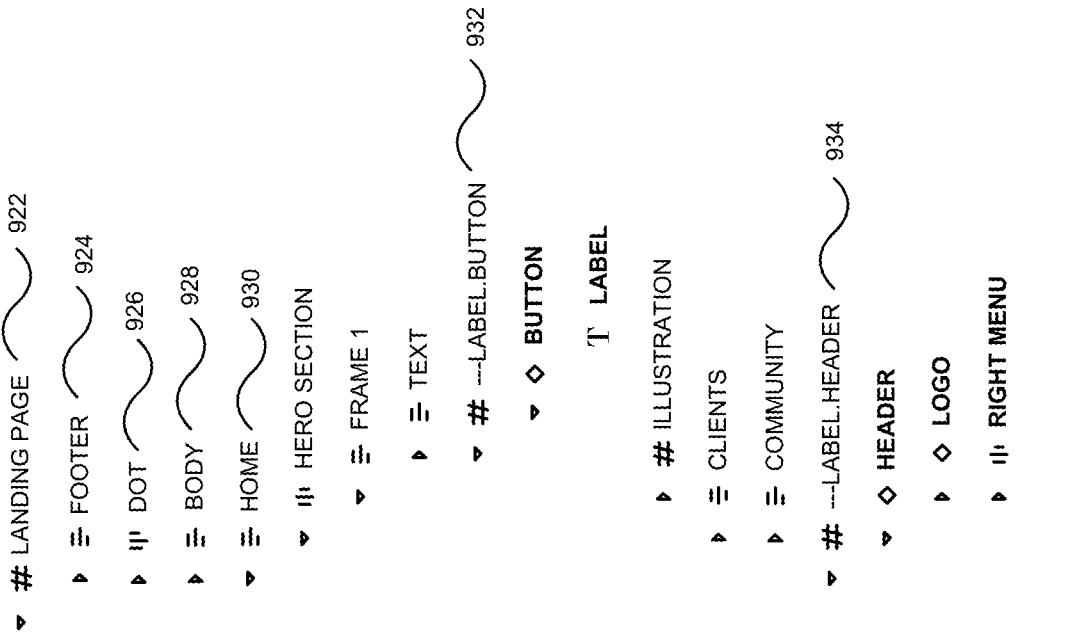
FIG. 9B depicts an example of a labeling technique that may be applied in accordance with an illustrative embodiment.
Figure 9A:
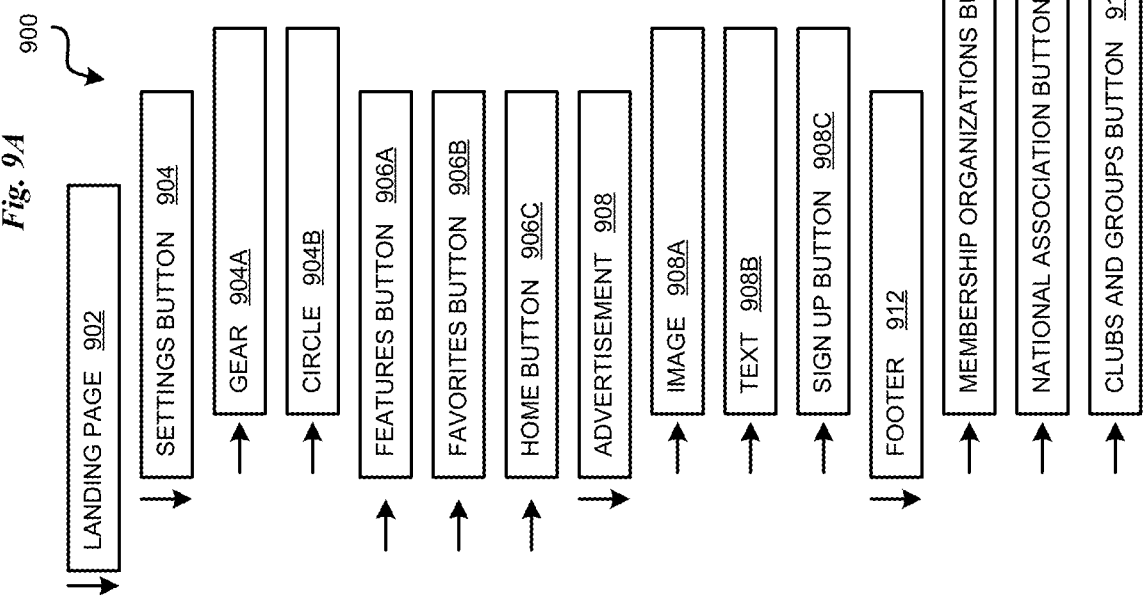
FIG. 9A depicts an example structured data of an example UI design that can be exported from a UI design tool and used in accordance with an illustrative embodiment.

In the illustrated embodiment, UX design tool 202 produces structured data 202A. Structured data 202A represents a UI design and contains the various design elements and components used in the UI. Document Object Model (DOM) data is a non-limiting example of structured data 202A. A non-limiting example of structured data 202A is depicted in FIGS. 9A-9B.

Compliance system 204 is a data processing system that is used for creating, storing, and manipulating compliance specifications. One of the outputs of compliance system 204 is specification 204A pertaining to one or more compliant components.

Compliance enforcement engine 206 receives structured data 202A as input. Component identification module 208 detects the UI components present in structured data 202A. Compliance check module 210 identifies from the detected components those components that are subject to compliance specification and verifies whether an identified component meets the compliance specification. In order to make this determination, compliance check module 210 obtains compliant component spec 204A that best fits the identified component. For example, if the identified component is a button of a certain type, compliance system 204 may have a compliance specification for that type of button and accordingly, spec 204A may include that compliance specification for that type of button.

In another example, the identified component may be a custom component designed by the UI-UX designer and may not have an exact match in compliance system 204. In such a case one or more other types of components may have some degree of similarity or relevance with the custom component. Accordingly, spec 204A may include one or more compliance specifications of the one or more other types of similar or relevant components.

Compliance adjustment module 212 performs one or both of the following functions (i) and (ii):

(i) apply a compliance adjustment to a parameter of a detected component according to spec 204A. Ideally, when the detected component has an exact match in compliance system 204, all parameters of the detected component can be brought into compliance according to spec 204A. For example, each attribute of the component can be compared with acceptable attribute values defined in the spec 204A, and if the attribute is out of spec, the attribute can be modified to bring it into specification (e.g., changed to the nearest acceptable value). When the detected component differs from any single compliant component in compliance system 204, compliance adjustment module 212 applies a best-fit approach. For example, by adjusting and bringing into compliance as many parameters of the detected component as possible using corresponding compliant parameter values from the one or more compliant components in spec 204A.

(ii) in addition to, or instead of applying an adjustment to a detected component, compliance adjustment module 212 sends instruction 212A to the UX designer or UX design tool 202. Using instruction 212A, the designer can modify the detected component and either substitute the detected component with a compliant component from compliance system 204, or make compliance modification to the detected component to make the detected component best fit one or more compliant components in compliance system 204.

An output from compliance enforcement engine 206 is compliance-adjusted structured data 206A corresponding to structured data 202A pertaining to the UX design created in UX design tool 202. Code generation engine 214 takes compliance-adjusted structured data 206A as one input in order to produce front-end UI code 220. Where data 206A includes a compliant component that is available in a repository of compliance system 204, compliant component assembly module 216 retrieves code 216A of that compliant component from compliance system 204. Code generation module 218 generates the code for the remainder of the UI aspects and UI components. Code generation engine 214 outputs front-end UI code 220, which includes code 216A assembled by module 216 for each compliant component in data 206A and the generated code from module 218 for the remainder of the UI described in data 206A.

Figure 3:
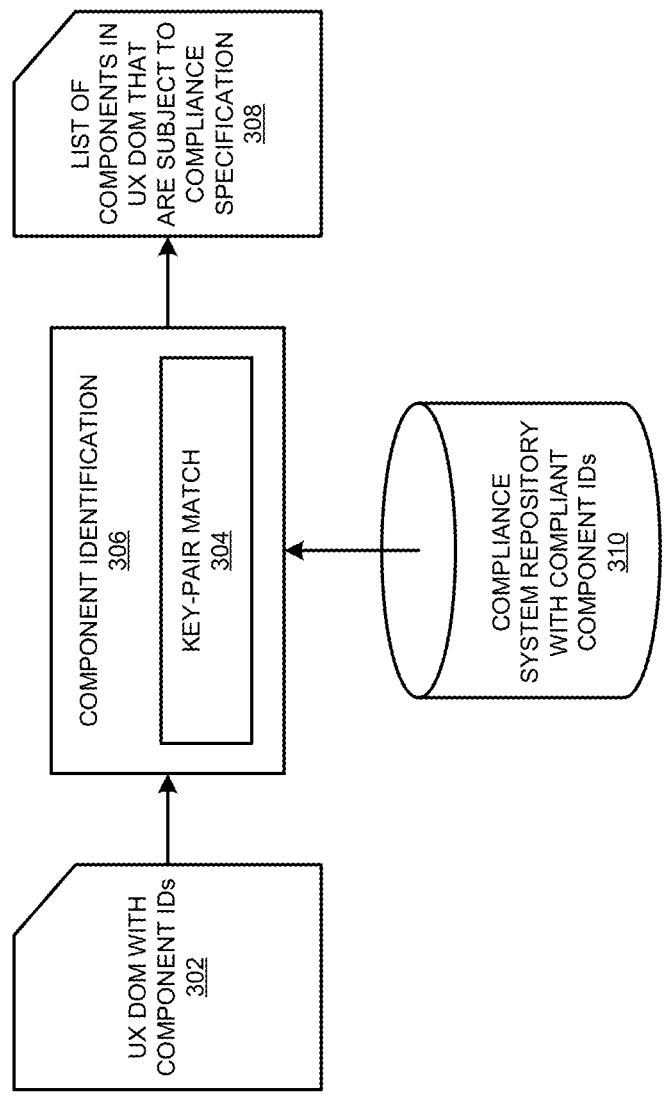
FIG. 3 depicts a block diagram of one configuration of a component identification module that can be used in a compliance enforcement engine in accordance with an illustrative embodiment.

FIG. 3 depicts a block diagram of one configuration 300 of a component identification module that can be used in a compliance enforcement engine in accordance with the illustrative embodiments. Module 306 can be used as module 208 in FIG. 2. Although the structured data of UX designs can take many forms, for convenience and simplification of the description, DOM is used and depicted as a non-limiting example of the structured data of UX designs. UX DOM 302 is one variation of structured data 202A in FIG. 2 in that DOM 302 includes unique identifiers of the UI components used therein.

Correspondingly, compliant system repository 310, which is associated with compliance system 204 in FIG. 2, includes compliant components, which are also identified by unique identifiers. Component identification module 306 uses a key-pair matching method to identify the components in DOM 302 that are subject to compliance specification. Unique component identifiers from DOM 302 are matched with corresponding unique identifiers from repository 310. Where a one-to-one mapping is not found or is unavailable, a best-fit methodology, as described earlier, is applied to identify the nearest best-fit compliant component(s). The correspondence between different components for the best-fit strategy can be implemented in any suitable manner, including but not limited to notations in compliant component records in repository 310 to identify the possible applicability of a compliant component specification to a set of types of components. Similar notations can be placed in tables, profiles, and other data structures that are accessible to module 306.

Module 306 outputs list 308. List 308 includes at least the identifiers of those components from DOM 302 that are subject to compliance specification. List 308 may also include the identifiers of one or more compliant components from repository 310 in correspondence with one or more listed components from DOM 302.

Figure 4:
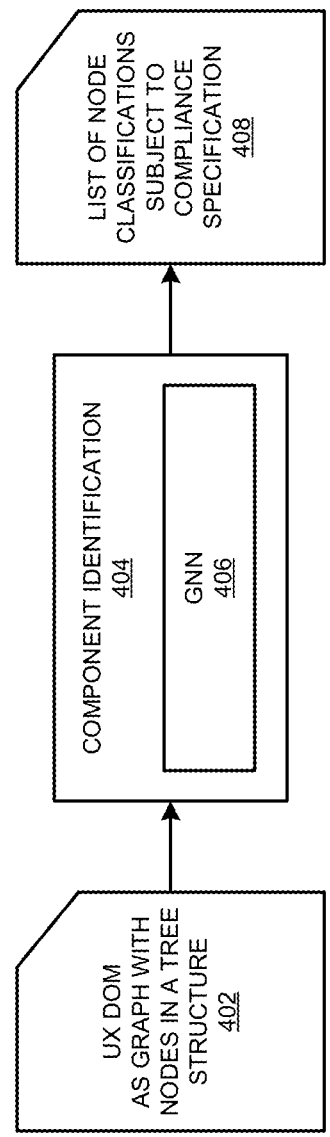
FIG. 4 depicts a block diagram of another configuration of a component identification module that can be used in a compliance enforcement engine in accordance with an illustrative embodiment.

FIG. 4 depicts a block diagram of another configuration 400 of a component identification module that can be used in a compliance enforcement engine in accordance with the illustrative embodiments. Module 404 can be used as module 208 in FIG. 2. Although the structured data of UX designs can take many forms, for convenience and simplification of the description, DOM is used and depicted as a non-limiting example of the structured data of UX designs. UX DOM 402 is another variation of structured data 202A in FIG. 2 in that DOM 402 includes a graph representation of the UI in which the UI components are represented as nodes and related with frames and layers via edges in a tree-like structure.

Module 404 includes, or interacts with an instance of GNN 406. The details of the training of GNN 406 and the mechanism by which GNN 406 identifies certain UI components is described in U.S. patent application Ser. No. 19/044,971, which was previously incorporated by reference herein. In summary, a GNN is trained to recognize nodes, or sub-tree, in the design layers. A UI design can be converted into a graph, more specifically into a tree structure. Each node in the tree represents a frame, and the edges represent the parent-child relationships among frames. Each component may be seen as subtree of the design's tree. A GNN may be trained on recognizing root nodes of the components, in a node classification setting. The GNN classifies the nodes, thereby classifying the corresponding UI components, into different classes, including one or more classes of the nodes or component that may be subject to compliance specifications. In one example implementation, the list of possible node labels for the classification task can be the list of components plus a 'None' class. For instance: <button>, <list>, <text_input>, ..., <none>.

Module 404 outputs list 408. List 408 includes at least the node classifications of those components from DOM 402 that are subject to compliance specification.

Figure 5:
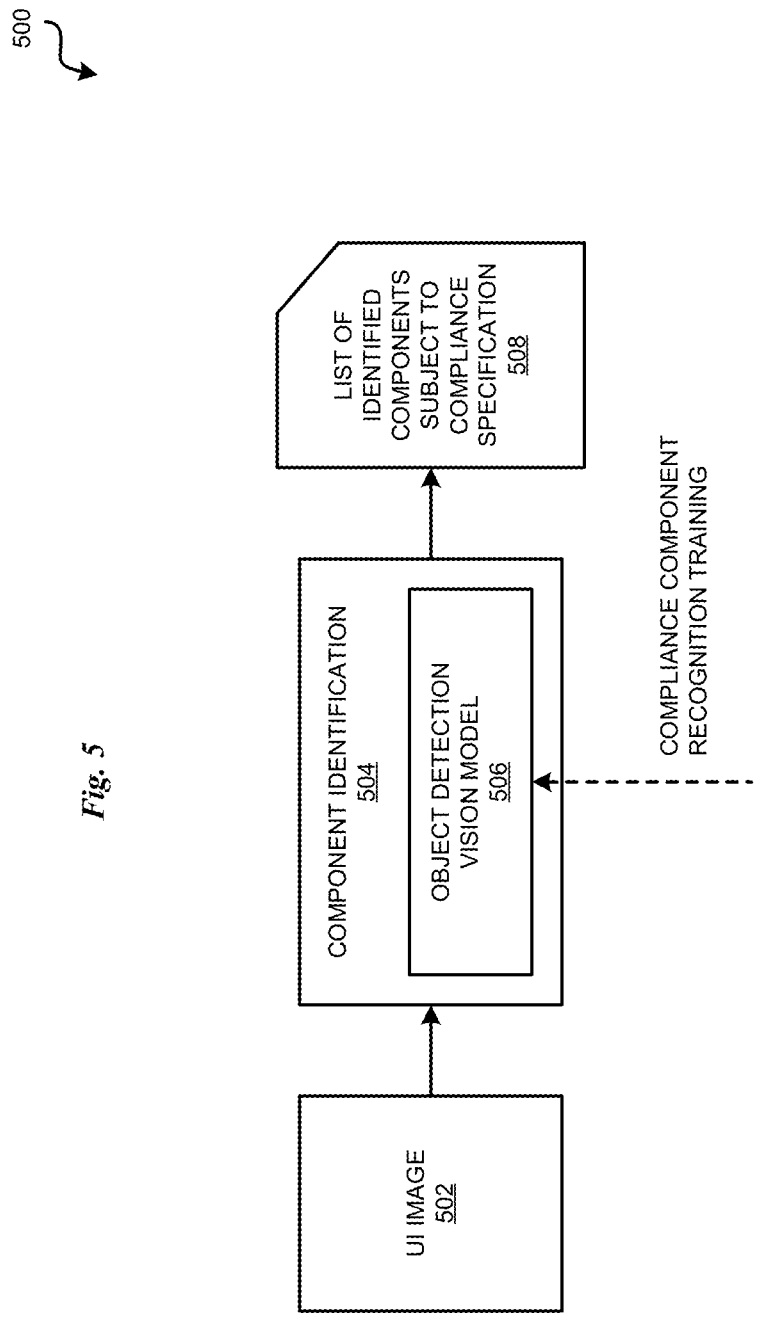
FIG. 5 depicts a block diagram of another configuration of a component identification module that can be used in a compliance enforcement engine in accordance with an illustrative embodiment.

FIG. 5 depicts a block diagram of another configuration 500 of a component identification module that can be used in a compliance enforcement engine in accordance with the illustrative embodiments. Module 504 can be used as module 208 in FIG. 2. Although the structured data of UX designs can take many forms, UI image 502 is another variation of structured data 202A in FIG. 2 in that image 502 includes a graphical representation of the UI in which the UI components are represented as visual artifacts of an image.

Module 504 includes, or interacts with, an instance of model 506, which is an artificial intelligence (AI) object detection vision model configured and trained to detect and classify objects in images. Model 506 is trained to visually recognize components from the image export of a UI design, e.g., image 502. Model 506 can be trained to recognize not only the UI components, but more specifically one or more classes of components that may be subject to compliance specifications.

To train model 506 in accordance with an embodiment, a training set for model 506 may be automatically created by exporting a set of images of UI design from a UI design tool API, pinpointing the position of known components, and labeling them with bounding boxes. The dataset can be created with a folder of design images and for each design image, a textual file containing a list of bounding boxes defined, for some embodiments, as quintuple of <label, center_X,center_Y,width,height>.

Module 504 outputs list 508. List 508 includes at least the identification of those components from image 502 that are subject to compliance specification.

Figure 6:
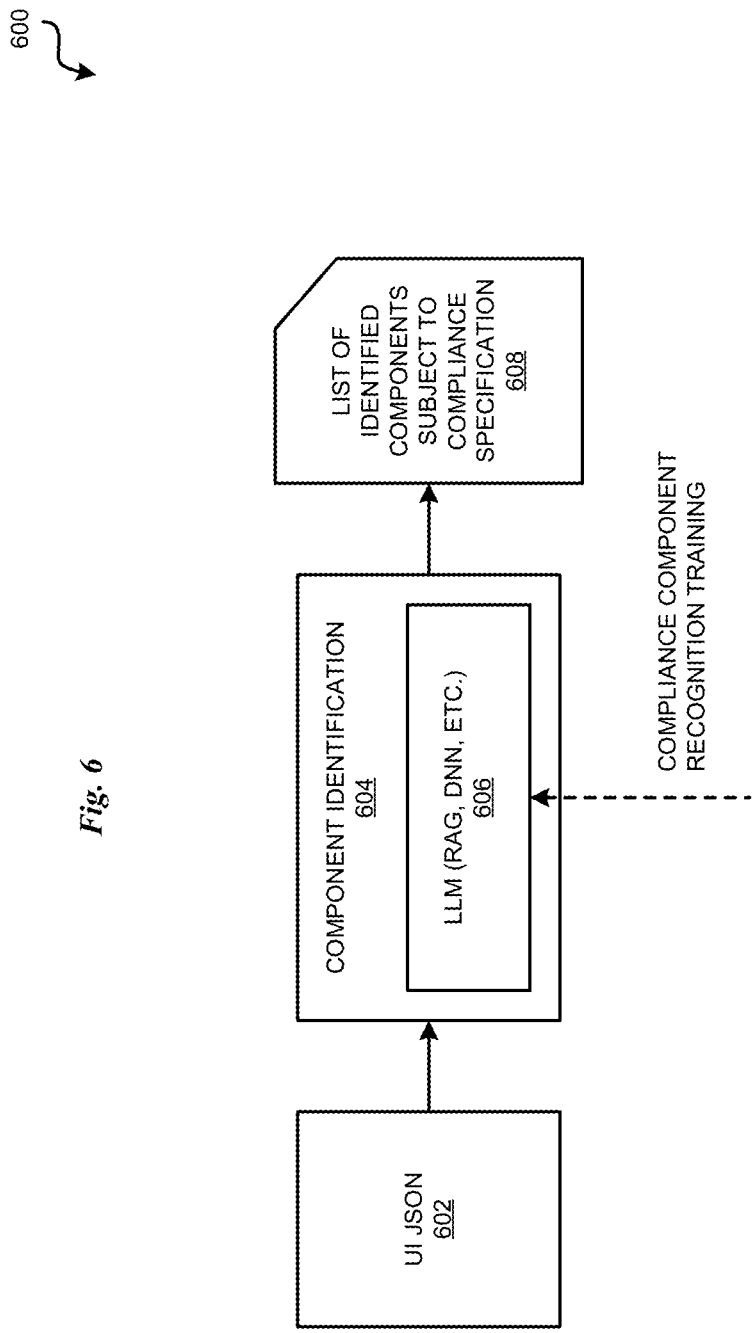
FIG. 6 depicts a block diagram of another configuration of a component identification module that can be used in a compliance enforcement engine in accordance with an illustrative embodiment.

FIG. 6 depicts a block diagram of another configuration 600 of a component identification module that can be used in a compliance enforcement engine in accordance with the illustrative embodiments. Module 604 can be used as module 208 in FIG. 2. JavaScript Object Notation (JSON) is a lightweight data-interchange format. Although the structured data of UX designs can take many forms, UI JSON 602 is another variation of structured data 202A in FIG. 2 in that JSON 502 includes UI aspects, elements, and components encoded as object data in a form that is human readable as well as machine readable.

Module 604 includes, or interacts with, an instance of language model 606, which can be a large language model (LLM), a small language model (SLM), a Retrieval-Augmented Generation (RAG) pipeline operating with an LLM or SLM, a deep neural network (DNN), or another suitable type of AI model configuration.

Module 604 uses model 606 to scan JSON 602 (or a processed version thereof) of a UI design and look for similarities and patterns that can be classified as known components—i.e., components that are likely to be subject to compliance specifications. In a similar manner, a Machine Learning (ML) technique, such as decision trees, Support Vector Machine (SVM) algorithms, or Deep Neural Networks (DNN) can also be used in place of model 606 and applied to a set of specifically engineered features, created with the information available in the JSON, classifying each frame of the design into categories in a manner similar to the node prediction and classification with GNN 406 in FIG. 4.

Figure 7:
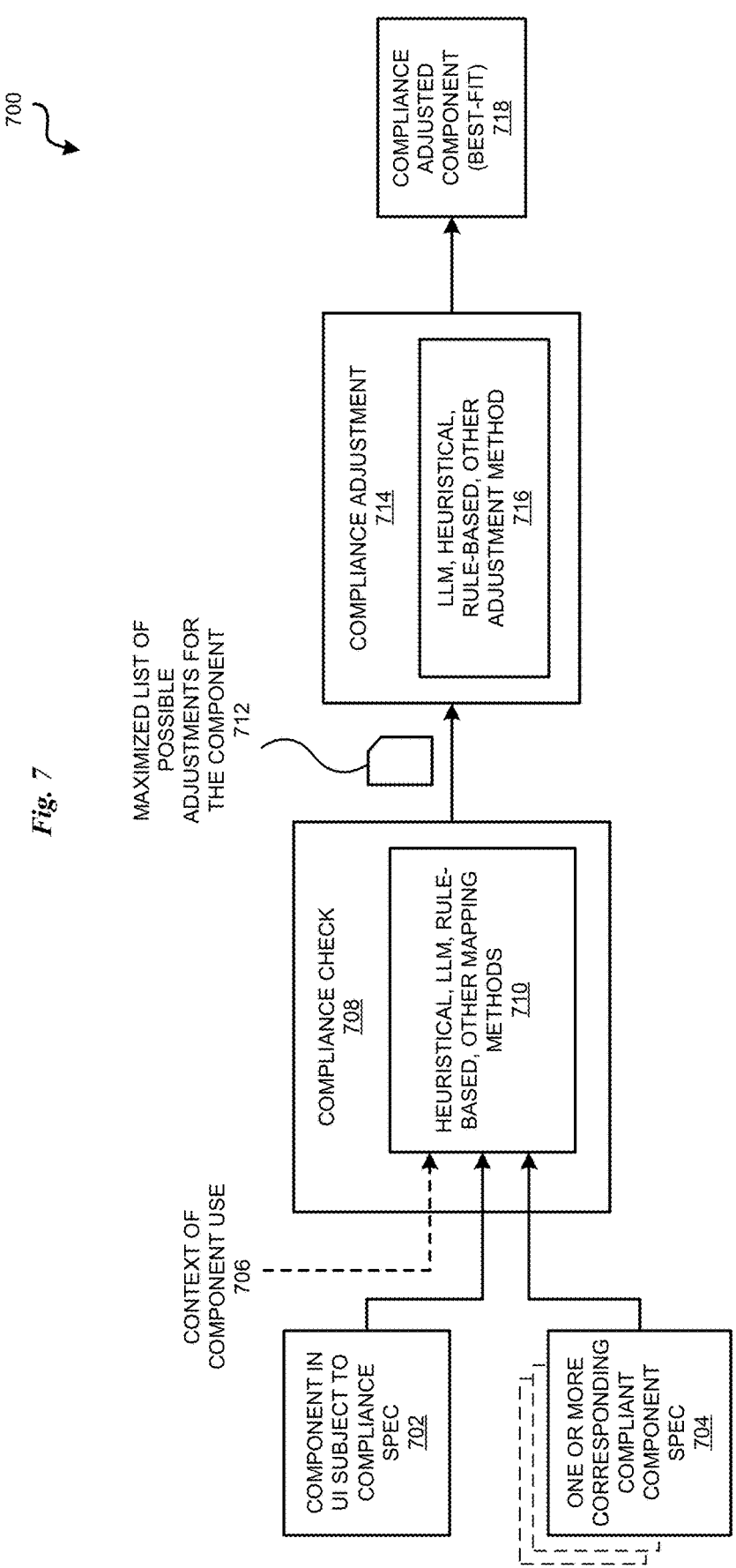
FIG. 7 depicts a block diagram of compliance checking and adjustment configuration 700 in accordance with an illustrative embodiment.

FIG. 7 depicts a block diagram of compliance checking and adjustment configuration 700 in accordance with the illustrative embodiments. Module 708 can be used as module 210 in FIG. 2 and module 714 can be used as module 212 in FIG. 2.

Input 702 can be the output of any of the configurations depicted in FIGS. 3-6 and identifies those components in the UI design that are subject to compliance specifications. Input 704 is obtained from a compliance system repository, such as repository 310 in FIG. 3. In one embodiment, context information 706 is also supplied to module 708. For example, in some cases, a component of UI may not be subject to compliance specification at all, or may be subject to differing compliance specifications from a selection of applicable compliance specifications, depending on the context in which the component is used in the UI design. Context information 706 is available or extractable from the structured data of the UI design, such as by identifying the frame or layer with which a component might be associated in the design.

Module 708 includes, or interacts with, implementation 710 of any of several methods for checking whether a component is compliant. Implementation 710 may implement a heuristic method of checking compliance, an AI model trained to detect compliance in the component parameters, a rule-based checking of component parameters for compliance, or other methods that map component parameters to corresponding parameters of one or more compliant component specifications.

Module 708 outputs list 712. List 712 includes maximized, or best-fit adjustments that are possible for a component identified in input 702.

List 712 serves as an input to compliance adjustment module 714. As described earlier in this disclosure, module 714 applies an adjustment to a parameter of a component to make the component consistent with a compliance specification, instructs a UI designer to make the suggested adjustment, or both. When module 714 applies the adjustments, module 714 outputs list 718, which includes components that are subject to compliance specification and have been compliance-adjusted in a best-fit manner described herein. List 718 can take any suitable form to be consumable by a code generation module for the assembly of ready-made compliant component code and generated code for other UI elements.

Figure 8:
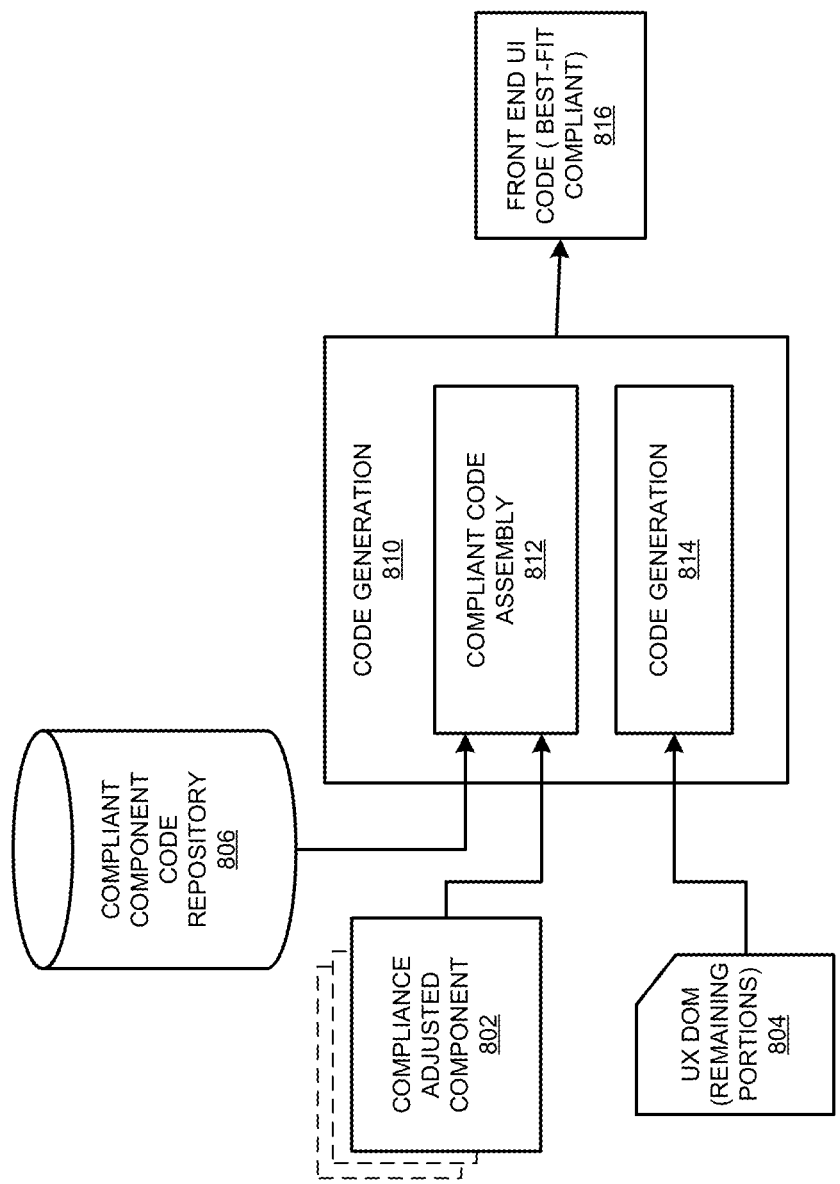
FIG. 8 depicts a block diagram of code generation configuration in accordance with an illustrative embodiment.

FIG. 8 depicts a block diagram of code generation configuration 800 in accordance with the illustrative embodiments. Code generation module 810 can be used as module 214 in FIG. 2. Input 802 is a suitable form of list 718 output from module 714 and includes a listing of one or more compliance-adjusted components. Input 804 may be all or a portion of the structured data exported from a UI design tool, such as inputs 202A, 302, 402, 502, or 602 in FIGS. 2, 3, 4, 5, and 6, respectively. For example, input 804 may include only those portions of the structured data that pertain to other non-compliance-specific elements of the UI design. Compliant component code repository 806 may be a part of compliance system 204 of FIG. 2, and provide compliant component code, such as code 216A in FIG. 2.

Compliant code assembly submodule 812 assembles the ready-made code of compliance-adjusted components as may be available from repository 806. For all components and UI elements-whether subject to compliance specification or not, for which code is not available from repository 806, code generation submodule 814 generates the code. Module 810 puts together the ready-made code and the generated code to produce front-end UI code 816, which includes UI components that have automatically been adjusted for compliance in a best-fit manner.

FIGS. 9A-9B depict an example structured data of an example UI design that can be exported from a UI design tool and used in the manner of input 202A of FIG. 2. For example, the representation shown within FIG. 9A may be generated by and/or used within a UI design tool corresponding to a UI design. The visualization depicted in FIG. 9A may represent a graphical arrangement of the hierarchy of the nodes within the UI.

Landing page 902, for example, may be a frame or layer that is a parent to settings button 904, features button 906A, favorites button 906B, home button 906C, advertisement 908, and footer 912. Although not shown in FIG. 9A for simplicity, landing page 902 may also be a parent to a log in button, a sign up button, and one or more icons. Settings button 904 may include a frame or layer that is a parent to gear 904A and circle 904B (which also may be one or more frames and/or layers) that together make up the component that is settings button 904. Similarly, advertisement 908 may include a frame or layer that is a parent to image 908A, text 908B, and sign up button 908C, and footer 9012 may include a frame or layer that is a parent to membership organizations button 910A, national associations button 912B, and clubs and groups button 910C. Accordingly, some components of graphical user interface 900 may be nested within other components. For example, advertisement 908 includes sign up button 908C and footer 912 includes buttons 910A-C, each of which may include additional frames, layers, and/or components. While specific components and frames are illustrated for example purposes, any graphical user interface comprising any arrangement of components and/or the nodes representing such components may be represented via a similar structural diagram.

FIG. 9B illustrates an example of such a labeling technique as may be applied in accordance with one or more embodiments. As shown, landing page 922 may be a frame or layer that includes footer component 924, dot layer 926, body component 928, and home component 930. In this example, labels 932 and 934 (respectively designated as "---label.button" and "---label.header") may be added to identify the respective components. A graph neural network 124 may, for example, be trained on such training data (e.g., using a backpropagation mechanism and a cross-entropy loss function) to predict the correct root classifications, component classifications to each node, etc. as indicated by the labels.

Figure 10:
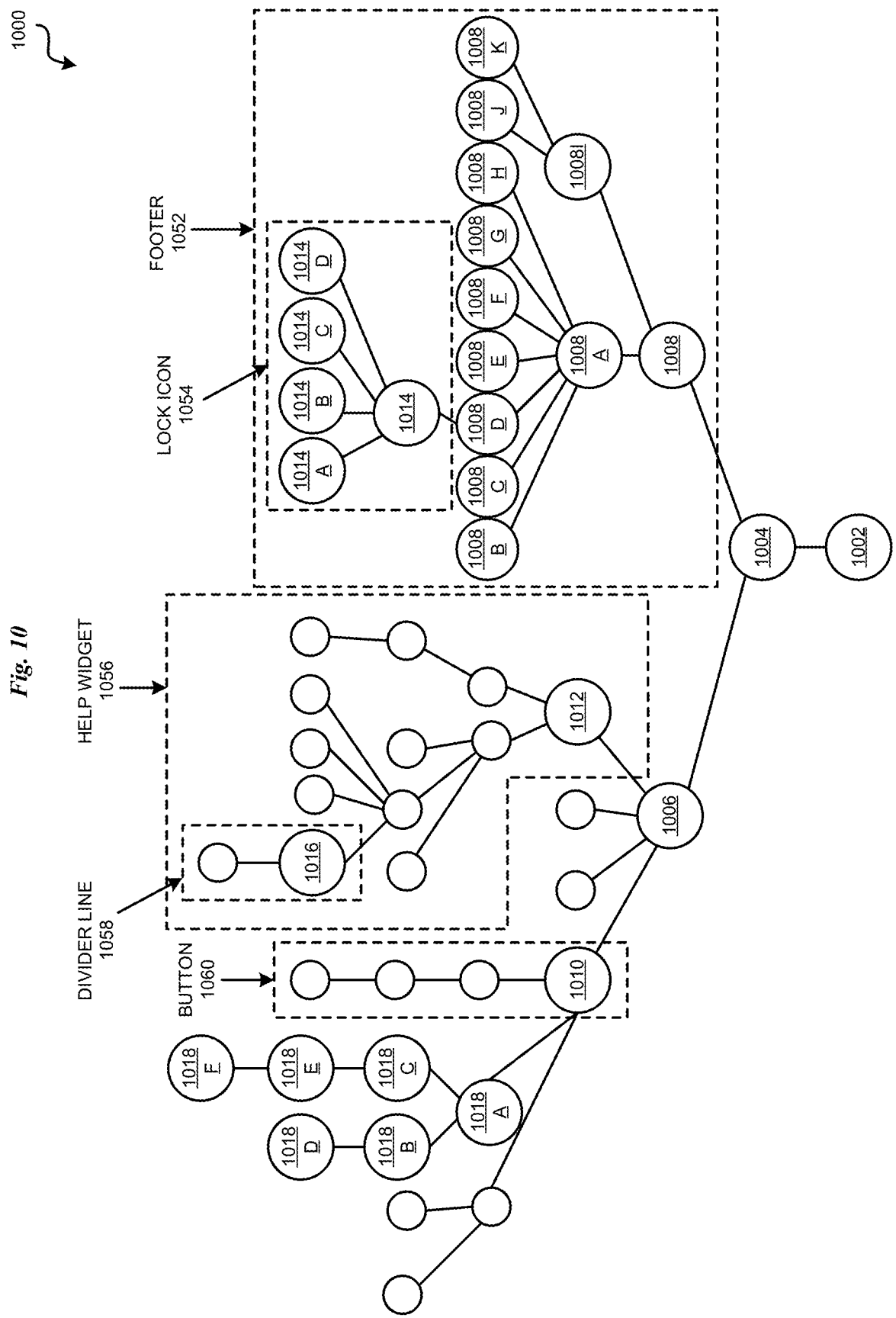
FIG. 10 depicts an example of a UI design represented as a tree structure in accordance with an illustrative embodiment.

FIG. 10 depicts an example of a UI design represented as a tree structure in accordance with the illustrative embodiments. As shown, the nodes of tree structure 1000 represent frames and/or layers of a graphical user interface (e.g., graphical user interface 900). The nodes are connected by edges representative of relationships between corresponding nodes. For example, node 1002 corresponds to a parent node for the graphical user interface (e.g., similar to the landing page 902 for the graphical user interface 900); node 1004 corresponds to a child node of node 1002; nodes 1006 and 1008 correspond to child nodes of node 1004; etc. For example, the lines connecting the nodes in FIG. 10 may graphically indicate the parent/child relationships extracted from the interface design data object. In some embodiments, each node may have only a single immediate parent to which it is directly connected. In various embodiments, a component of a graphical user interface may include one or more of the plurality of frames and/or layers represented by the nodes and the one or more of the plurality of nodes may include at least one root node defining a start of the component and at least one leaf node defining a lowest layer or frame of the component. For example, node 1008 corresponds to a node that is also a root node of footer component 1052. Footer component 1052 includes lock icon component 1054 which also includes the several nodes as shown by several nodes 1014 and 1014A, 1014B, 1014C, and 1014D within the lock icon component 1054. Similarly, the nodes 1014, 1010, 1012, and 1016 each correspond to a root node. In this manner, the nodes 1008, 1010, 1012, 1014, and 1016 may also be referred to as root nodes.

Other components are laid out in a similar tree-subtree manner. Help widget 1056 is a subtree rooted in node 1012 which is a child node of node 1006. Divider line subtree 1058 is rooted in node 1016, which is eventually rooted in nodes 1012 and further down the line to node 1006. Button subtree 1060 comprises several nodes rooted in node 1010. Other nodes representative of other features on the graphical UI 900 can similarly appear in tree 1000, such as nodes 1018A, 1018B, 1018C, 1018D, 1018E, and 1018F.

Figure 11:
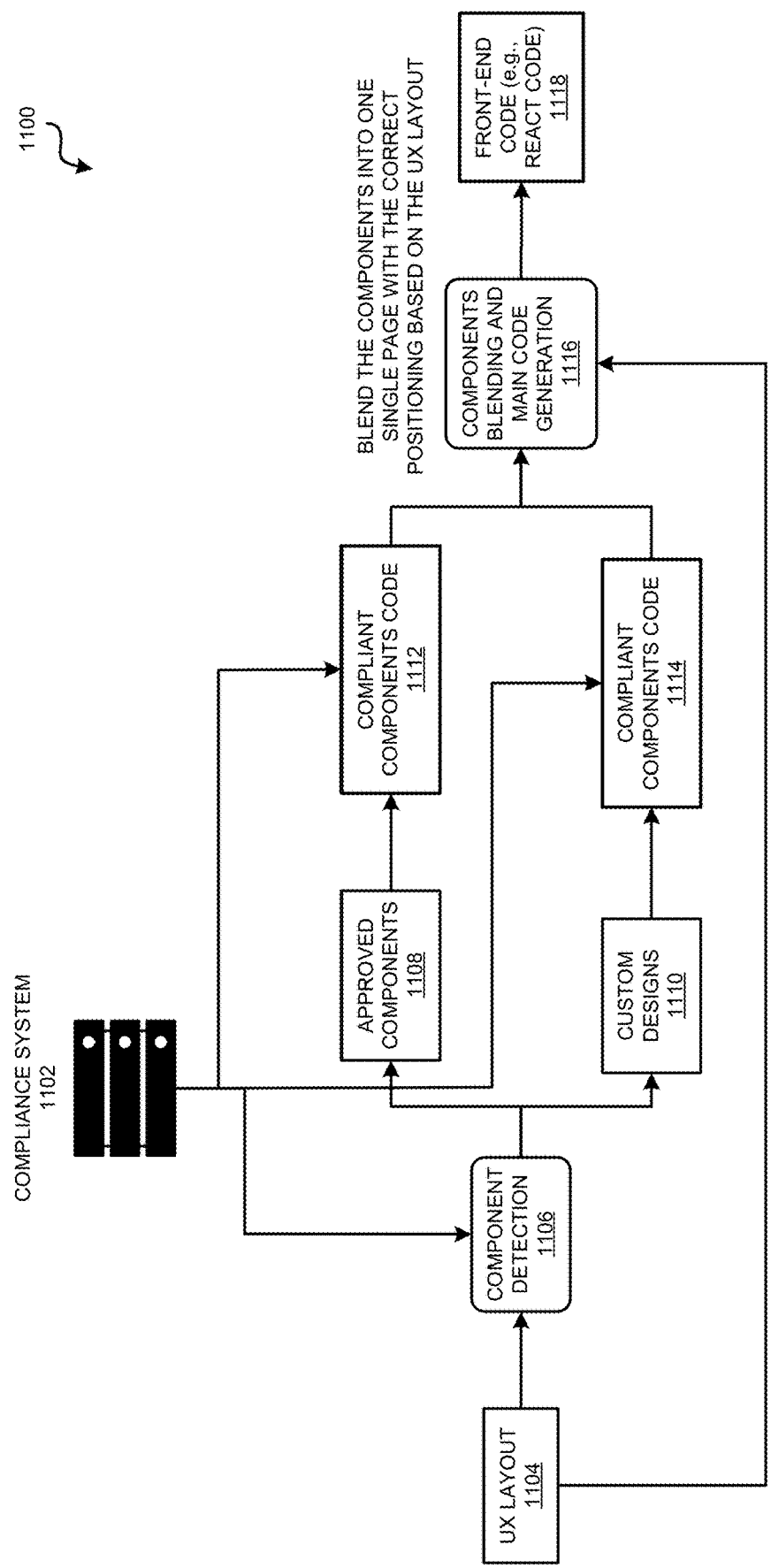
FIG. 11 depicts a flowchart of an example process for automatic generation of compliant user interface code in accordance with an illustrative embodiment.

FIG. 11 depicts a flowchart of an example process for automatic generation of compliant user interface code in accordance with the illustrative embodiments. Process 1100 uses compliance system 1102, which is similar to compliance system 204 in FIG. 2 and operates in a similar manner. UX layout 1104 is a structured data output of a UI-UX design tool, such as structured data 202A in FIG. 2.

Component detection operation 1106 is a combination of the operations performed by modules 208 and 210 in FIG. 2. Component detection operation 1106 accepts UX layout 1104 as input and obtains compliance specifications from compliance system 1102 to verify whether the UX design includes components that are subject to compliance specifications. Operation 1106 outputs two lists of components. The first list-list 1108, is of approved components, i.e., components that are subject to compliance specification and are already in compliance. The second list-list 1110 is of components that digress from approved components, such as due to customization of the component design.

For the components in list 1108, operation 1106 causes an extraction of compliant component code blocks 1112 from compliance system 1102. For the components in list 1110, operation 1106 causes a best-fit adjustment as described herein, and correspondingly, an extraction of best-fit compliant component code blocks 1114 from compliance system 1102.

Operation 1116 blends or assembles the code blocks 1112 and 1114 with code generation for the remaining aspects of the UX layout 1104. Operation 1116 outputs front-end UI code 1118, a non-limiting example of which is code usable with REACT tool.

Figure 12:
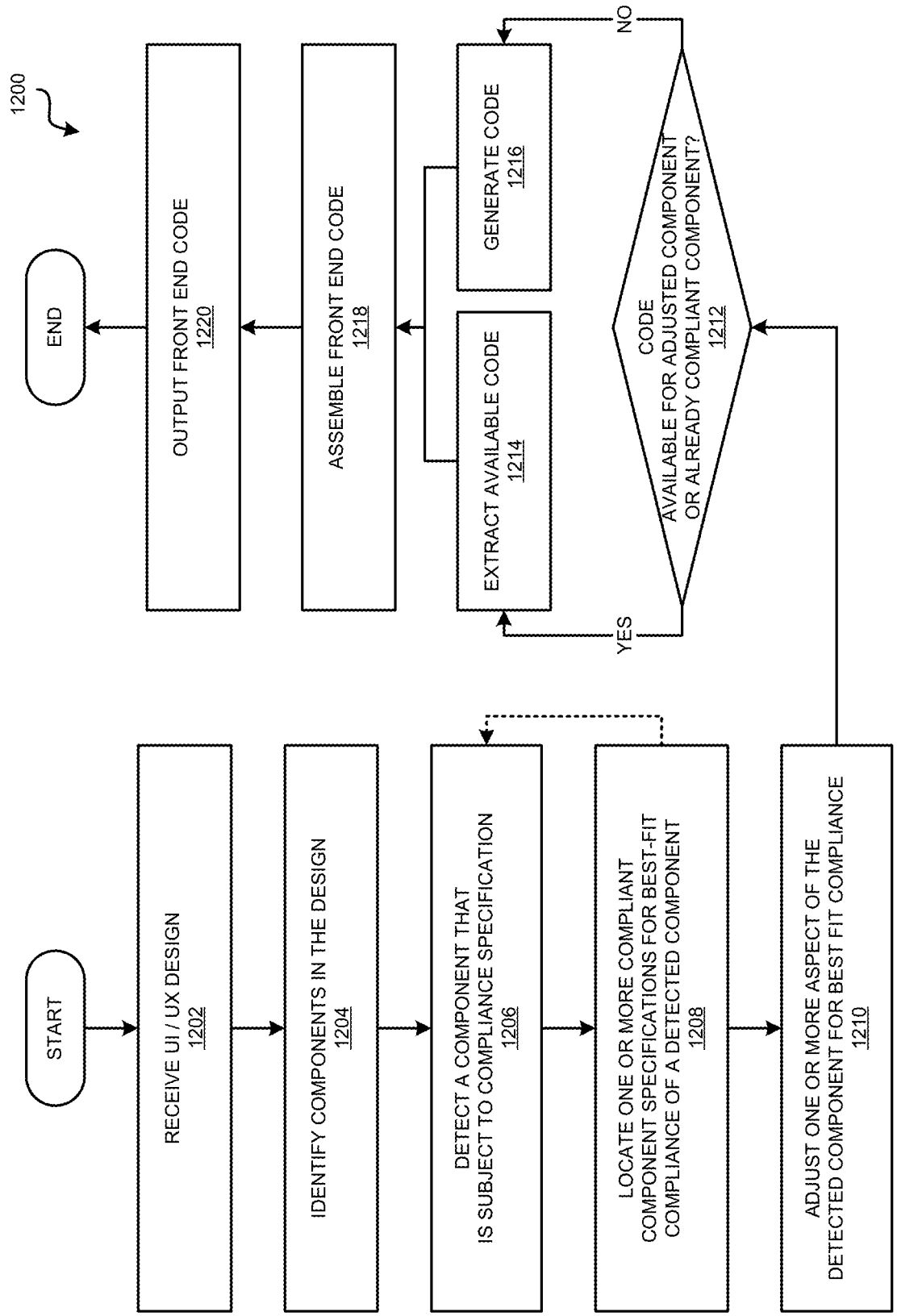
FIG. 12 depicts another flowchart of an overall process of automatic generation of compliant user interface code in accordance with an illustrative embodiment.

FIG. 12 depicts another flowchart of an overall process of automatic generation of compliant user interface code in accordance with the illustrative embodiments. Process 1200 can be implemented in configuration 200 of FIG. 2.

The process begins by receiving structured data of UI-UX design (block 1202). The process identifies the components that are present in the design (block 1204). The process detects a component that is subject to compliance specification 9block 1206). The process locates one or more compliant component specifications for best-fit compliance of a detected component (block 1208). The process repeats blocks 1206-1208 for as many compliance-related components as can be detected in the design.

The process adjusts one or more aspects or parameters of the detected component for best fit compliance (block 1210). The process determines whether ready-made code block is available in a compliance system repository for an adjusted component or for a component that is already compliant (block 1212). If code block is available ("Yes" path of block 1212), the process extracts the available code block for the component (block 1214). If code block is not available ("No" path of block 1212), the process triggers code generation for the component and any remaining portions of the UI-UX design (block 1216). The process assembles or blends the extracted code blocks and the generated code to automatically create the front-end code for the UI-UX design (block 1218). The process outputs the front-end code (block 1220). The process ends thereafter.

For the sake of clarity of the description, and without implying any limitation thereto, the illustrative embodiments are described using some example configurations. From this disclosure, those of ordinary skill in the art will be able to conceive many alterations, adaptations, combinations, and modifications of described configurations for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the embodiments herein. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, the present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventive concepts are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
enabling automatic graphical user interface (UI) code adaptation according to a dynamically changing specification without changing a linking with a predefined UI elements library, the enabling comprising:
executing a code on a hardware processor configured for detecting, by an enforcement application executing in a data processing system and responsive to a change made in a compliance specification at a first time, a UI component in structured data corresponding to a UI design loaded in a memory accessible to the enforcement application;
executing a code on the hardware processor configured for determining, at the first time, using the compliance specification, the UI component to be non-compliant, the compliance specification being selected based on a context of use of the UI design wherein the UI component is subject to different compliance specifications based on different contexts of use of the UI component in the UI design, and wherein the UI component is not subject to any compliance specification in at least one context;
executing a code on the hardware processor configured for extracting a code block from the compliance system repository, wherein the code block is executable to render a compliant component in place of the UI component on a UI rendering from the UI design; and
executing a code on the hardware processor configured for combining, to automatically output a front-end UI code, the code block with generated code, the generated code corresponding to another element of the UI design, and the front-end UI code rendering a complete UI page corresponding to the UI design, the UI page being compliant with a version of the compliance specification existing at the first time.

2. The computer-implemented method of claim 1, further comprising:
executing a code on the hardware processor configured for adjusting, to form an adjusted UI component, a parameter of the UI component based on a corresponding parameter value specified in the compliance specification, and wherein the extracting the code block includes selecting the code block in the compliance system repository based on a best fit match between the adjusted UI component and a compliant UI component in the compliance system repository.

3. The computer-implemented method of claim 1, further comprising:

executing a code on the hardware processor configured for adjusting, to form an adjusted UI component, a first parameter of the UI component based on a first corresponding parameter value specified in the compliance specification corresponding to a first compliant UI component, a second parameter of the UI component based on a second corresponding parameter value specified in a second compliance specification corresponding to a second compliant UI component, and wherein the extracting the code block includes selecting a plurality of code blocks in the compliance system repository based on a best fit match between the adjusted UI component and the first compliant UI component and the second compliant UI component; and executing a code on the hardware processor configured for combining the plurality of code blocks to form the code block.

4. The computer-implemented method of claim 1, further comprising:

executing a code on the hardware processor configured for determining, using a second compliance specification a second UI component to be compliant;

executing a code on the hardware processor configured for extracting from the compliance system repository a second code block corresponding to the second UI component; and executing a code on the hardware processor configured for blending, as a part of the combining, the second code block into the front-end UI code.

5. The computer-implemented method of claim 1, further comprising:

executing a code on the hardware processor configured for receiving the structured data via an application programming interface (API) of a UI design application.

6. The computer-implemented method of claim 1, wherein the structured data comprises a document object model (DOM).

7. The computer-implemented method of claim 1, wherein the structured data comprises a tree structure, the tree structure comprising a set of nodes connected via a set of edges, wherein a subset of the set of nodes is representative of the UI component, and an edge from a node in the subset of nodes is representative of a positional relationship of the UI component to an element of the UI design.

8. The computer-implemented method of claim 1, wherein the compliance specification comprises a set of values corresponding to a set of parameters of a compliant UI component.

9. The computer-implemented method of claim 1, wherein the compliant component is a variation of the UI component where a maximum number of parameters adjustable for compliance have been adjusted for compliance in accordance with the compliance specification.

10. A computer program product comprising one or more computer readable storage media, and program instructions collectively stored on the one or more computer readable storage media, the program instructions executable by a set of one or more processors to cause the set of one or more processors to perform operations comprising:

enabling automatic graphical user interface (UI) code adaptation according to a dynamically changing specification without changing a linking with a predefined UI elements library, the enabling comprising:

executing a code on the set of one or more processors configured for detecting, by an enforcement application executing in a data processing system and responsive to a change made in a compliance specification at a first time, a UI component in structured data corresponding to a UI design loaded in a memory accessible to the enforcement application;

executing a code on the set of one or more processors configured for determining, at the first time, using the compliance specification, the UI component to be non-compliant, the compliance specification being selected based on a context of use of the UI design wherein the UI component is subject to different compliance specifications based on different contexts of use of the UI component in the UI design, and wherein the UI component is not subject to any compliance specification in at least one context;

executing a code on the set of one or more processors configured for extracting a code block from the compliance system repository, wherein the code block is executable to render a compliant component in place of the UI component on a UI rendering from the UI design; and executing a code on the set of one or more processors configured for combining, to automatically output a front-end UI code, the code block with generated code, the generated code corresponding to another element of the UI design, and the front-end UI code rendering a complete UI page corresponding to the UI design, the UI page being compliant with a version of the compliance specification existing at the first time.

11. The computer program product of claim 10, the operations further comprising:

executing a code on the set of one or more processors configured for adjusting, to form an adjusted UI component, a parameter of the UI component based on a corresponding parameter value specified in the compliance specification, and wherein the extracting the code block includes selecting the code block in the compliance system repository based on a best fit match between the adjusted UI component and a compliant UI component in the compliance system repository.

12. The computer program product of claim 10, the operations further comprising:

executing a code on the set of one or more processors configured for adjusting, to form an adjusted UI component, a first parameter of the UI component based on a first corresponding parameter value specified in the compliance specification corresponding to a first compliant UI component, a second parameter of the UI component based on a second corresponding parameter value specified in a second compliance specification corresponding to a second compliant UI component, and wherein the extracting the code block includes selecting a plurality of code blocks in the compliance system repository based on a best fit match between the adjusted UI component and the first compliant UI component and the second compliant UI component; and executing a code on the set of one or more processors configured for combining the plurality of code blocks to form the code block.

13. The computer program product of claim 10, the operations further comprising:
   executing a code on the set of one or more processors configured for determining, using a second compliance specification a second UI component to be compliant;
   executing a code on the set of one or more processors configured for extracting from the compliance system repository a second code block corresponding to the second UI component; and
   executing a code on the set of one or more processors configured for blending, as a part of the combining, the second code block into the front-end UI code.

14. The computer program product of claim 10, the operations further comprising:
   executing a code on the set of one or more processors configured for receiving the structured data via an application programming interface (API) of a UI design application.

15. The computer program product of claim 10, wherein the structured data comprises a document object model (DOM).

16. The computer program product of claim 10, wherein the structured data comprises a tree structure, the tree structure comprising a set of nodes connected via a set of edges, wherein a subset of the set of nodes is representative of the UI component, and an edge from a node in the subset of nodes is representative of a positional relationship of the UI component to an element of the UI design.

17. The computer program product of claim 10, wherein the compliance specification comprises a set of values corresponding to a set of parameters of a compliant UI component.

18. The computer program product of claim 10, wherein the stored program instructions are stored in a computer readable storage device in a data processing system, and wherein the stored program instructions are transferred over a network from a remote data processing system.

19. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
   executing a code on the set of one or more processors configured to meter use of the program instructions associated with the request; and
   executing a code on the set of one or more processors configured to generate an invoice based on the metered use.

20. A computer system comprising a set of one or more processors and one or more computer readable storage media, and program instructions collectively stored on the one or more computer readable storage media, the program instructions executable by the set of one or more processors to cause the processor to perform operations comprising:
   executing a code on the set of one or more processors configured for detecting, in a structured data corresponding to a graphical user interface (UI) design, a UI component;
   executing a code on the set of one or more processors configured for enabling automatic graphical user interface (UI) code adaptation according to a dynamically changing specification without changing a linking with a predefined UI elements library, the enabling comprising:
   executing a code on the set of one or more processors configured for executing a code configured for detecting, by an enforcement application executing in a data processing system and responsive to a change made in a compliance specification at a first time, a UI component in structured data corresponding to a UI design loaded in a memory accessible to the enforcement application;
   executing a code on the set of one or more processors configured for determining, at the first time, using the compliance specification, the UI component to be non-compliant, the compliance specification being selected based on a context of use of the UI design wherein the UI component is subject to different compliance specifications based on different contexts of use of the UI component in the UI design, and wherein the UI component is not subject to any compliance specification in at least one context;
   executing a code on the set of one or more processors configured for extracting a code block from the compliance system repository, wherein the code block is executable to render a compliant component in place of the UI component on a UI rendering from the UI design; and
   executing a code on the set of one or more processors configured for combining, to automatically output a front-end UI code, the code block with generated code, the generated code corresponding to another element of the UI design, and the front-end UI code rendering a complete UI page corresponding to the UI design, the UI page being compliant with a version of the compliance specification existing at the first time.

* * * * *